United States Patent
Loh et al.

(10) Patent No.: US 7,784,699 B2
(45) Date of Patent: Aug. 31, 2010

(54) THERMAL IDENTIFICATION OF DATA STORAGE DEVICES

(75) Inventors: Weng Wah Loh, Bristol (GB); Fraser John Dickin, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1054 days.

(21) Appl. No.: 11/485,427

(22) Filed: Jul. 13, 2006

(65) Prior Publication Data

US 2007/0012776 A1  Jan. 18, 2007

(30) Foreign Application Priority Data

Jul. 16, 2005  (GB) .................... 0514658.4

(51) Int. Cl.
  G06K 19/06  (2006.01)
  G06K 7/00   (2006.01)
  G06K 7/08   (2006.01)
  G06K 19/00  (2006.01)

(52) U.S. Cl. .......... 235/492; 235/435; 235/439; 235/451; 235/487

(58) Field of Classification Search .......... 235/435, 235/439, 451, 487, 492; 340/10.1, 572.1, 340/572.4

See application file for complete search history.

(56) References Cited

U.S. PATENT DOCUMENTS

| 5,774,062 | A  | * | 6/1998 | Ikefuji ................ 340/10.4 |
| 7,268,685 | B2 | * | 9/2007 | Kwon et al. .......... 340/572.1 |
| 7,503,690 | B2 | * | 3/2009 | Song et al. ............. 374/127 |
| 7,586,397 | B2 | * | 9/2009 | Bayley et al. ......... 340/10.4 |

FOREIGN PATENT DOCUMENTS

WO   9314474 A1   7/1993

OTHER PUBLICATIONS

Abstract GB 2395592 Hewlett Packard Co May 26, 2004.

* cited by examiner

*Primary Examiner*—Thien M. Le
*Assistant Examiner*—April A Taylor (57) ABSTRACT

A data storage device includes a temperature sensor. The temperature sensor outputs a temperature signal corresponding to a detected temperature. An identification unit connected to the temperature sensor generates and outputs an identification signal based on the temperature signal. A plurality of such data storage devices can therefore be identified by their relative position to an interrogator which outputs heat.

20 Claims, 7 Drawing Sheets

THERMAL IDENTIFICATION OF DATA STORAGE DEVICES

CLAIM TO PRIORITY

This application claims priority to co-pending United Kingdom utility application entitled, "Thermal Identification of Data Storage Devices" having serial no. GB 0514658.4, filed Jul. 16, 2005, which is entirely incorporated herein by reference.

TECHNICAL FIELD

This invention relates to identification of data storage devices. In particular, the present invention relates to an apparatus, system and method of identification using heat detection at the data storage devices. The data storage device may be a memory tag.

BACKGROUND

Wireless data transfer has become commonplace in recent years as the number of electronic devices which communicate with each other has increased.

Wireless communication links can be direct "line-of-sight" communication links in which there is a direct path between the transmitter of one device and the receiver of the other device. In such communication links, the receiver must be located within the path of the signal used to transmit data between the devices. Of course, the path of the signal may not necessarily be a straight line between the transmitter and receiver—the signal may, for example, be reflected off one or more surfaces. An example of a "line-of-sight" communication link is an infra-red communication link in which an electromagnetic wave is generated at the transmitter in the infra-red spectrum of the electromagnetic spectrum ("an infra-red signal"). In such communication links, the transmitting device will generally "know" that it is transmitting to a given device if there are a number of possible receiving devices in its vicinity. This is because the transmitting device will have to be directed towards the given device for communication to be possible.

However, short range communication links may be direct communication links in which there does not need to be a direct "line-of-sight" signal path between the transmitter and receiver ("a non-line-of-sight communication link"). The transmitter does not need to be directed in any particular direction for a signal to be received by the receiver. An example of a non-line-of-sight communication link is a short range radio frequency (RF) communication link in which an electromagnetic wave is generated at the transmitter in the radio frequency range ("an RF signal"). In such communication links, a transmitting device cannot "know" with which receiving device it is communicating unless the receiving device has been previously identified.

Radio frequency identification tags (RFID) use short range RF communication. A memory tag is an example of an RFID tag.

RFID tags come in many forms, but all comprise an integrated circuit on which data can be stored and a coil which enables it to be interrogated by a transceiver that also powers it by means of an RF wireless communications link. Some RFID tags include read-only memory (ROM) and are written to at the time of manufacture, whilst others have read and write capability.

RFID tags incorporate a number of elements. These include an antenna which couples inductively with an antenna in a tag transceiver, an RF decoder for decoding radio frequency signals received via the antenna, a processor for processing the received signals and an area of non-volatile memory. A voltage regulator in the processor operates to provide a constant voltage for powering the RFID tag.

In many situations, there will be no direct "line-of-sight" communication path between the RFID tag and the tag transceiver. For example, the RFID tag could be contained inside an article or piece of clothing. The RFID tag can also be inserted into sheets of paper or card which are then stacked together so that there is no direct "line of sight" communication path between individual tags in the stack.

Figure 1:
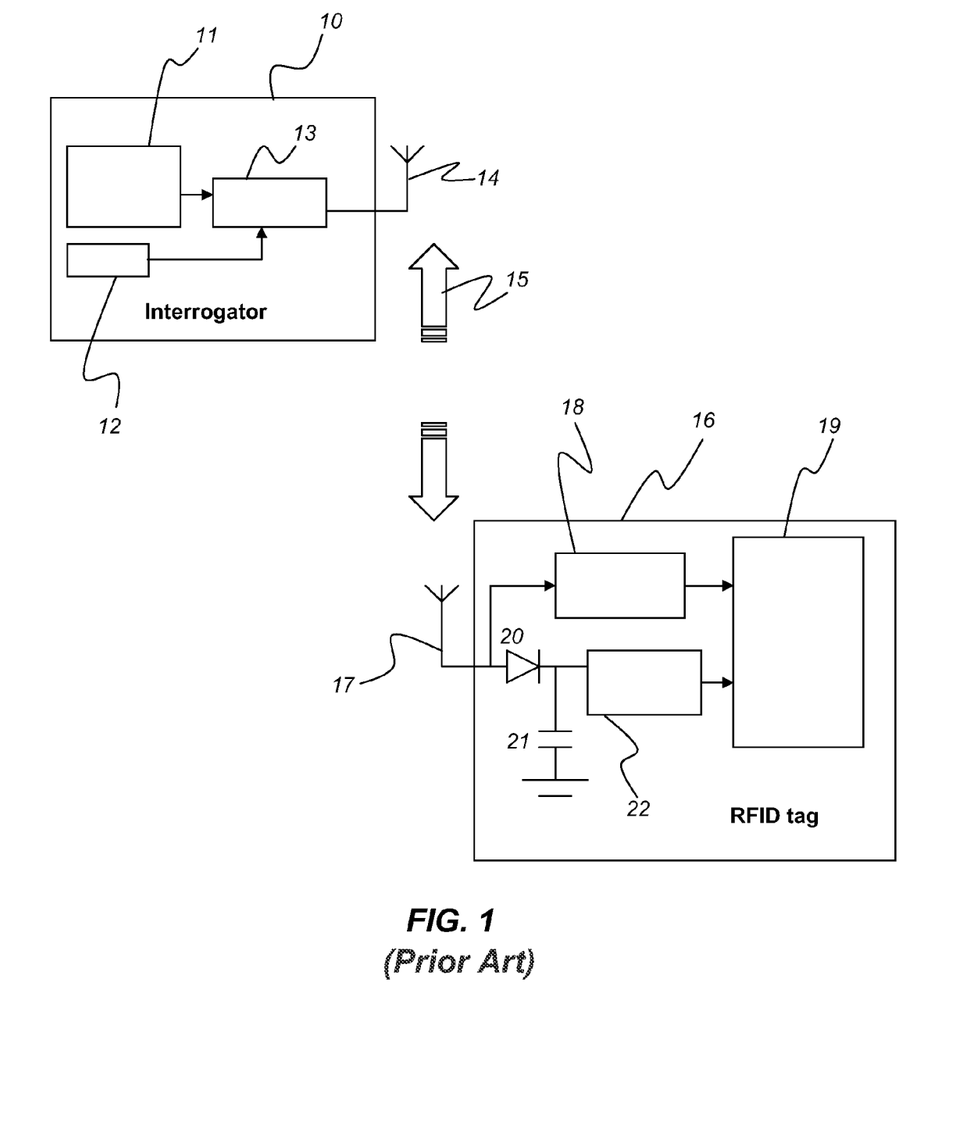
FIG. 1 is a schematic of a prior art communication system including a memory tag (as described above)

FIG. 1 shows an existing wireless communication system employing an RFID tag.

A transceiver 10 includes a radio frequency (RF) generator 11 and a data source 12. Digital data from the data source 12 is amplitude modulated in a modulator 13 onto an RF carrier output by the radio frequency generator 11. The resulting RF signal 15 is output from the transceiver 10 via a transmitter antenna 14.

A receiver 16 receives the RF signal 15 via a receiver antenna 17. The transmitted data is extracted from the RF signal 15 in demodulator 18 and passed to processing circuitry 19 in the RFID tag. In addition, the RF signal is passed through a diode 20 and across a capacitor 21 to generate a DC voltage. The DC voltage is passed through a voltage regulator 22 to generate a constant output voltage to act as a power supply for the processing circuitry 19.

As will be appreciated, there may be a number of RFID tags in the vicinity (and within communicating range) of a tag transceiver. It is desirable to be able to identify each tag independently so that data can be written to and received from an identified tag and subsequent communication can be directed to and from an identified tag.

One example of a situation in which it is important to be able to identify RFID tags is when they are stacked on top of each other, for example in memory tag enabled paper. It is important to be able to identify the uppermost tag in a stack of paper and the order of other tags in the stack so that data can be written to and received from the uppermost tag or a tag at a given position within the stack.

One problem with using RF signals to identify the proximity of tag to a transceiver is that dedicated circuitry is required within the tag to generate a received signal strength indicator (RSSI). Minimising the components used in a tag is important to reduce the cost and power consumption of individual tags—there is often no internal power source in memory tags.

Another problem with using RF signals to identify the proximity of tag to a transceiver is that misleading information may often be generated simply by relying on the RSSI because, although a particular device may be physically closer to an interrogator, it may be shielded by an obstacle that reduces the received signal strength which would indicate that it was further away than another device which was not shielded by the obstacle and which was, in fact, located further away.

Existing techniques which are used to distinguish between wireless devices provide a unique identifier, e.g. a Media Access Control (MAC) address or an Internet Protocol (IP) address, for each device. However, these enumeration techniques do not provide the proximity of the wireless device. In fact, such enumeration techniques require large computing overheads and set up time. For example, an IP address (using version 6—IPv6 from The Internet Engineering Task Force) requires 128 bits of memory to store the IP address and substantial computing power to enumerate such an address.

The small size and power constraints of RFID tags means that it is desirable to minimise the computing power required to enumerate the address of a wireless device.

Using a unique identifier means that each wireless device has to be pre-programmed with its unique identifier during manufacture which increases its manufacturing cost.

SUMMARY

The present invention aims to address the aforementioned problems.

In a first aspect of the present invention, there is provided a method of identifying one or more of a plurality of data storage devices, comprising: heating the plurality of data storage devices with a heat source; receiving an interrogation signal transmitted from an interrogator at one or more of the data storage devices; measuring a temperature generated by the heat source at each data storage device at which the interrogation signal is received; generating an identifier corresponding to the detected temperature at each data storage device at which the interrogation signal is received; and transmitting the identifier in an identification signal to the interrogator.

In a second aspect of the present invention, there is provided an identification system, comprising: a plurality of data storage devices, each comprising: a temperature sensor configured to detect temperature and output a temperature signal corresponding to the detected temperature, and an identification unit connected to the temperature sensor and configured to generate and output, on receipt of an interrogation signal, an identification signal based on the temperature signal; and a heat source for heating the plurality of data storage devices.

BRIEF DESCRIPTION OF THE DRAWINGS

Specific embodiments of the present invention are now described, by way of example only, with reference to the accompanying drawings in which.

DETAILED DESCRIPTION OF EMBODIMENTS

Figure 2:
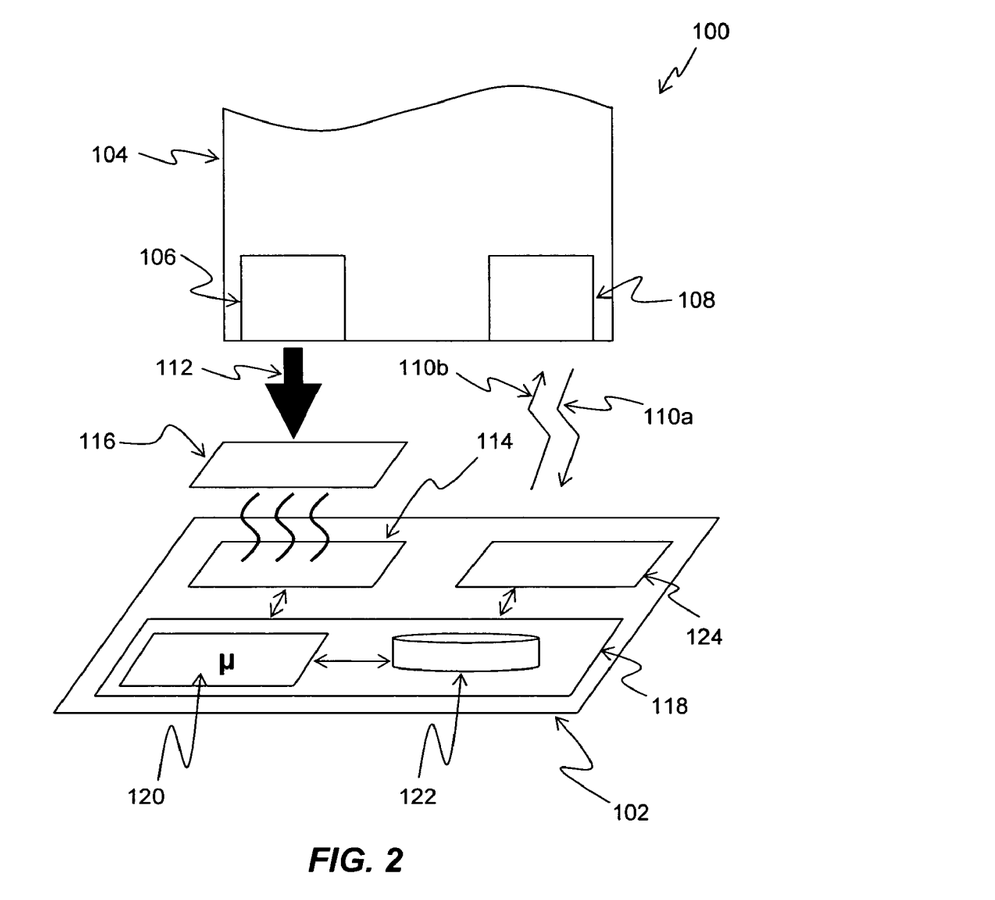
FIG. 2 is a schematic of a communication system according to the invention.
Figure 3:
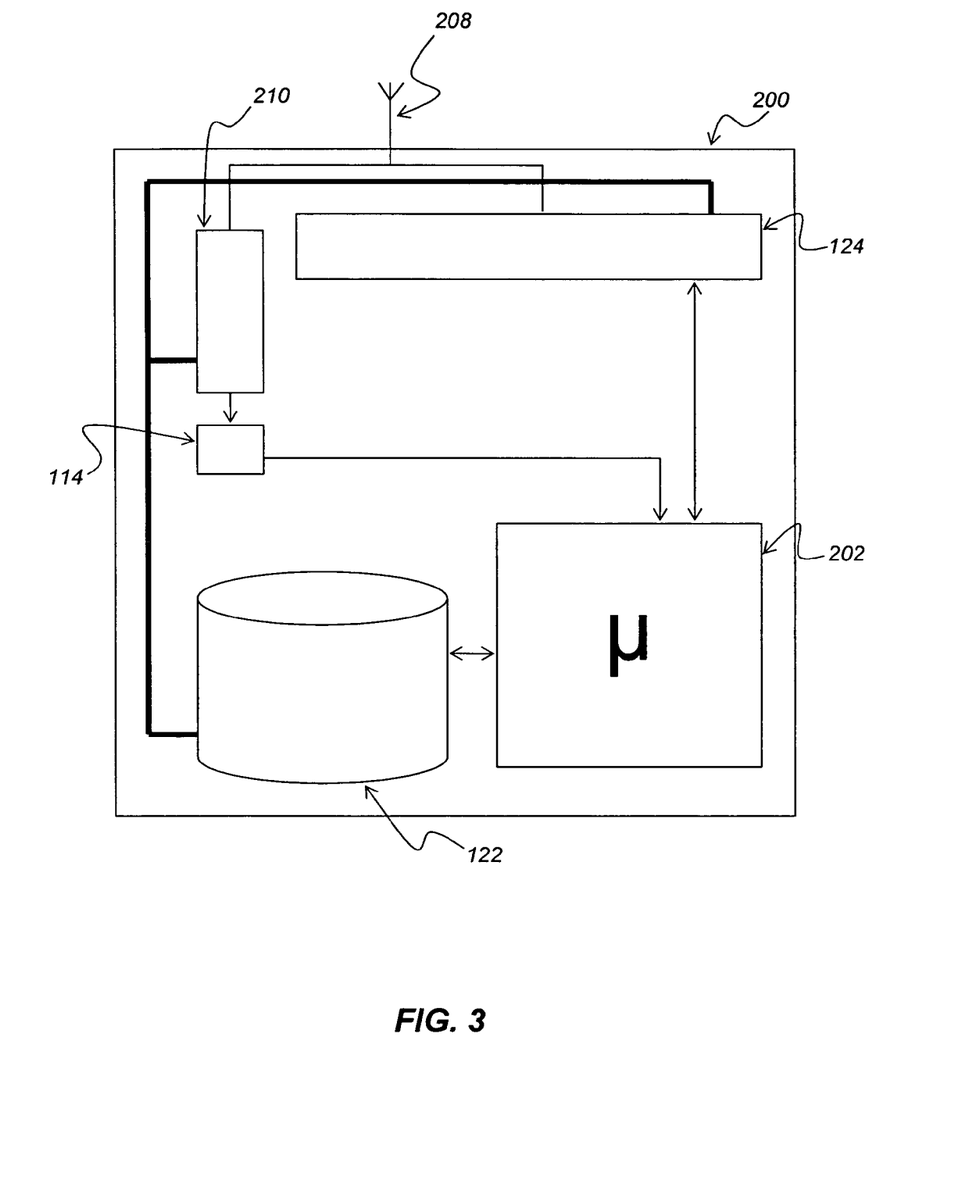
FIG. 3 is a schematic of a data storage device according to the invention.

The present invention, which will now be described with reference to FIG. 2, relates to a system 100 for transferring data to and receiving data from a data storage device 102. The data storage device 102 is shown in FIG. 3 in the form of a memory tag 200. However, as will be readily appreciated by the skilled reader, the invention is not limited to implementation in memory tags and may readily be implemented in other applications, especially those where identification of wireless data storage devices is required.

As stated above, the system 100 of the present invention comprises a data storage device 102 and an interrogator 104. The interrogator 104 comprises an interrogator transceiver 108 which outputs an RF signal 110a in which data is encoded from a data source (not shown) to the data storage device 102.

In addition, the interrogator transceiver 108 can receive an RF signal 110b transmitted from the data storage device 102.

The interrogator 104 further comprises a heat source 106. Any form of heat source (either directional or nondirectional) which causes a change in temperature at the data storage device 102 is suitable. For example, the heat source 106 may be a laser, which is directional and which can be directed at the data storage device 102. Alternatively, the heat source 106 may be a resistive element which is nondirectional and which does not necessarily need to be directed at the data storage device 102. In both cases, thermal energy 112 will be generated and output by the heat source 106 to heat the data storage device 102.

The thermal energy may be transmitted and received through any form of thermal phenomenon, e.g. thermal conduction or electromagnetic radiation which is converted to heat when it is incident on the data storage device 102. A thermal phenomenon is defined as any energy transfer mechanism which can be detected, either directly or indirectly at the data storage device 102 by measuring temperature.

The data storage device 102 comprises a heat sensor 114 which may be located behind a surface 116 of the outer casing of the data storage device 102. The thermal energy 112 output from the interrogator 104, when incident on the surface 116, causes the surface to heat up. The heat sensor 114 can detect this heating via conduction. The surface 116 may, for example, be the enclosure containing the data storage device 102. Alternatively, the surface 116 may be a section of memory tag enabled paper in which the data storage device 102 (implemented as a memory tag 200) is embedded. Of course, the surface 116 may comprise multiple layers of material in thermal contact with each other, for example multiple sheets of paper arranged in a stack of paper.

The term "paper" means any form of print medium, e.g. card, packaging, photographic paper etc.

The heat sensor 114 outputs a temperature voltage signal to identification unit 118. The temperature voltage signal is proportional to the temperature detected by the heat sensor 114.

The identification unit 118 comprises a processor 120 and memory 122. The processor 120 receives the temperature voltage signal and calculates a value for the temperature detected by the heat sensor 114 from known characteristics of the heat sensor 114. The processor 120 looks up and obtains an identification value for the detected temperature in the memory 122.

The identification unit 118 is also connected to device transceiver 124 which is configured to communicate with the interrogator transceiver 108 of the interrogator 104. The processor 120 is configured to read the temperature voltage signal and calculate a value for the temperature detected by the heat sensor 114 when a broadcast identification request transmitted from the interrogator transceiver 108 is received at device transceiver 124.

In one embodiment of the present invention, each value of temperature rounded to the nearest degree Celsius has an associated identification value. In an alternative embodiment of the present invention, a range of temperature values, for example each 5 degree Celsius range of temperature, has an associated identification value. In a still further embodiment of the invention, the relationship between temperature values and associated identification values may be non-linear.

The identification value only needs to be an 8-bit value to give 256 possible identification values which is a sufficient number of identification values for device identification in most short-range wireless communication systems. Since the identification value is only 8 bits, the processing power required to enumerate the identification value is negligible.

The memory 122 stores a lookup table of temperature values and corresponding identification values. An example of such a table is shown in Table 1 below.

TABLE 1

| Detected temperature/degrees C. | Identification value |
|---|---|
| 45-49 | 1 |
| 40-44 | 2 |
| 35-39 | 3 |
| 30-34 | 4 |
| 25-29 | 5 |
| 20-24 | 6 |
| 15-19 | 7 |
| 10-14 | 8 |
| 5-9 | 9 |
| 0-4 | 10 |

The processor 120 outputs the identification value to device transceiver 124 which broadcasts the identification value at a specified frequency in an RF signal 110b to interrogator transceiver 108 of the interrogator 104.

The processor 120 also then stores the determined identification value in the memory 122.

The identification value is transmitted from the device transceiver 124 in an ID packet which has a framing sequence with a transmission preamble, start bits, the identification code, stop bits and a cyclic-redundancy check (CRC) field. The CRC field is generated from the identification value by the processor 120.

The interrogator transceiver 108 decodes the identification value from a received RF signal and checks the identification value against the received CRC field to determine and resolve errors generated during transmission of the identification value. Additional error checking and correction is carried out by the interrogator transceiver 108 from an assessment of the order of received values. Since transmission of an identification value from each device transceiver 124 is delayed by an amount proportional to the transmitted identification value, the interrogator transceiver 108 expects to receive identification values from a plurality of data storage devices 102 in ascending order. If the identification values are not received in ascending order, the interrogator transceiver 108 will determine that there has been an error in transmission of the identification value and will carry out error correction using the received CRC field in conjunction with the actual received order of identification values.

Although the processor 120 and memory 122 have been described as components of the identification unit 118, the processor 120 and memory 122 will not be solely dedicated to generating an identification value for the data storage device 102 and will perform other general purpose functions, e.g. handling subsequent RF communication for data reading and writing from the memory 122 via device transceiver 124. Such a processor for use in memory tags is described in more detail in co-pending United Kingdom patent application publication No GB2395592 and application No GB0426771.2 filed on 7 Dec. 2004 the contents of which are incorporated herein by reference.

It will be appreciated that, in a an alternative embodiment, the identification unit 118 may be separate dedicated hard-wired circuitry configured to receive a temperature voltage signal from the heat sensor 114 and output an identification value to the device transceiver 124 or a general purpose device processor.

For a non-directional heat source, the heat energy received by the data storage device 102 from the heat source 106 is approximately inversely proportional to the square of the distance from the heat source 106 to the data storage device 102. Thus, in the case of a non-directional heat source 106 in which there are a plurality of data storage devices 102 in the vicinity of the interrogator 104, the temperature of each data storage device 102 will be less, the further each data storage device 102 is located from the interrogator 104. This way, by measuring the temperature of each data storage device 102 at a given instant, a determination can be made on the relative locations of each data storage device to the interrogator 104.

Different types of heat source will have different degrees of directionality. However, in general, the temperature detected by a given heat source 106 will reduce with distance from the heat source 106.

As can be seen from Table 1, each identification value is assigned to a corresponding temperature (or range of temperatures) so that the highest temperature has the lowest identification value. Thus, the data storage device 102 which is closest to the interrogator 104 will have the lowest identification value.

The processor 120 delays transmission of the determined identification value to the interrogator 104 by a time period (from receipt at the data storage device 102 of a broadcast identification request transmitted from the interrogator 104) which corresponds to the identification value (and hence detected temperature). This is to prevent overlapping transmissions from different data storage devices occurring at the same time and interfering with each other. Data storage devices located at different distances will detect different temperatures and will therefore delay transmission of their identification values by different periods of time so that the interrogator 104 receives only a single transmission at any one given instant of time.

The processor 120 is configured to calculate the delay based on the determined identification value in such a way that a lower identification value results in a shorter delay. Hence, data storage devices located closer to the interrogator 104 will transmit their identification value before devices located further away.

On receipt of identification values from data storage devices, the interrogator 104 can immediately identify from the received identification values the relative distance of all data storage devices located in its vicinity and can direct subsequent messages to specific data storage devices. This is done by transmitting an open-channel message from interrogator transceiver 108 which includes the identification value of the data storage device 102 to which it is desired to communicate. The open-channel message is received by all data storage devices located in the vicinity of the interrogator 104. However, the data storage devices are configured so that only the data storage device 104 which has the identification value stored in its memory which is also contained in the open-channel message responds to the open-channel message.

The open-channel message may be a command to transmit back to the interrogator 104 the contents of the memory 122 stored at a specific address in the data storage device 102. Alternatively, the open-channel message may be a command to write data contained in the open-channel message into memory 122 at an address specified in the open-channel message.

FIG. 3 shows the data storage device 102 in the form of a memory tag 200. The device transceiver 124 is connected to an RF antenna 208. In one embodiment of the invention, power circuitry 210 for the memory tag 200 is formed from a series diode connected to the RF antenna 208 in series with a capacitor and a voltage regulator (as shown in FIG. 1). There is no built-in power supply in the memory tag 200. Instead, an AC voltage signal received via the RF antenna 208 is converted to a DC voltage by power circuitry 210.

The power circuitry 210 provides a constant DC voltage to the heat sensor 114 which outputs a temperature voltage signal based on the temperature of the memory tag 200.

Figure 4:
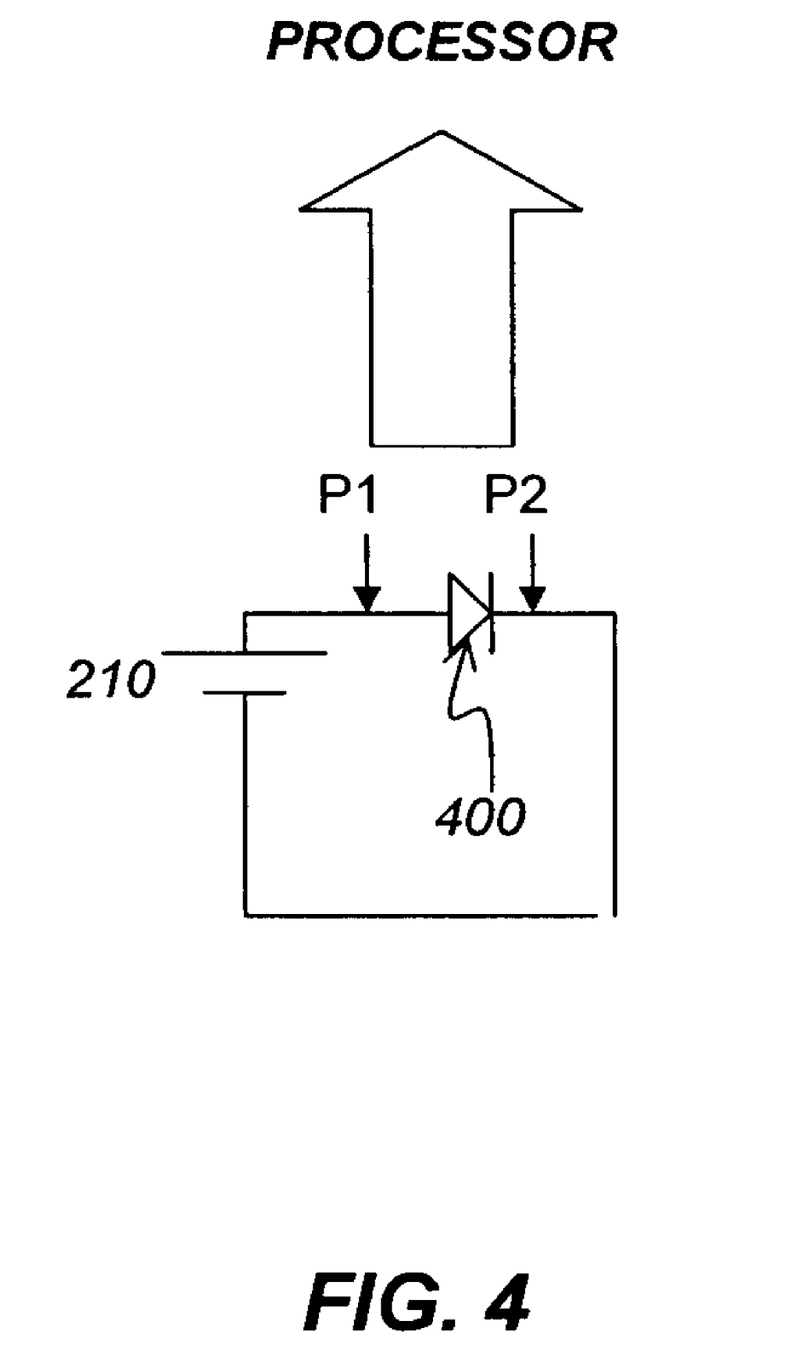
FIG. 4 is a schematic of a heat sensor used in the data storage device of FIG. 3.

FIG. 4 shows the circuit arrangement of heat sensor 114, specifically diode 400.

When a small forward bias is applied to the diode 400, the voltage drop across the diode junction (between P1 and P2) changes at a rate of about −2.24 mV/degree Celsius. Hence, variation in voltage across the diode 400 represents different temperatures detected by the heat sensor 114. The voltage P1-P2 is output as a temperature voltage signal to processor 120.

Figure 5:
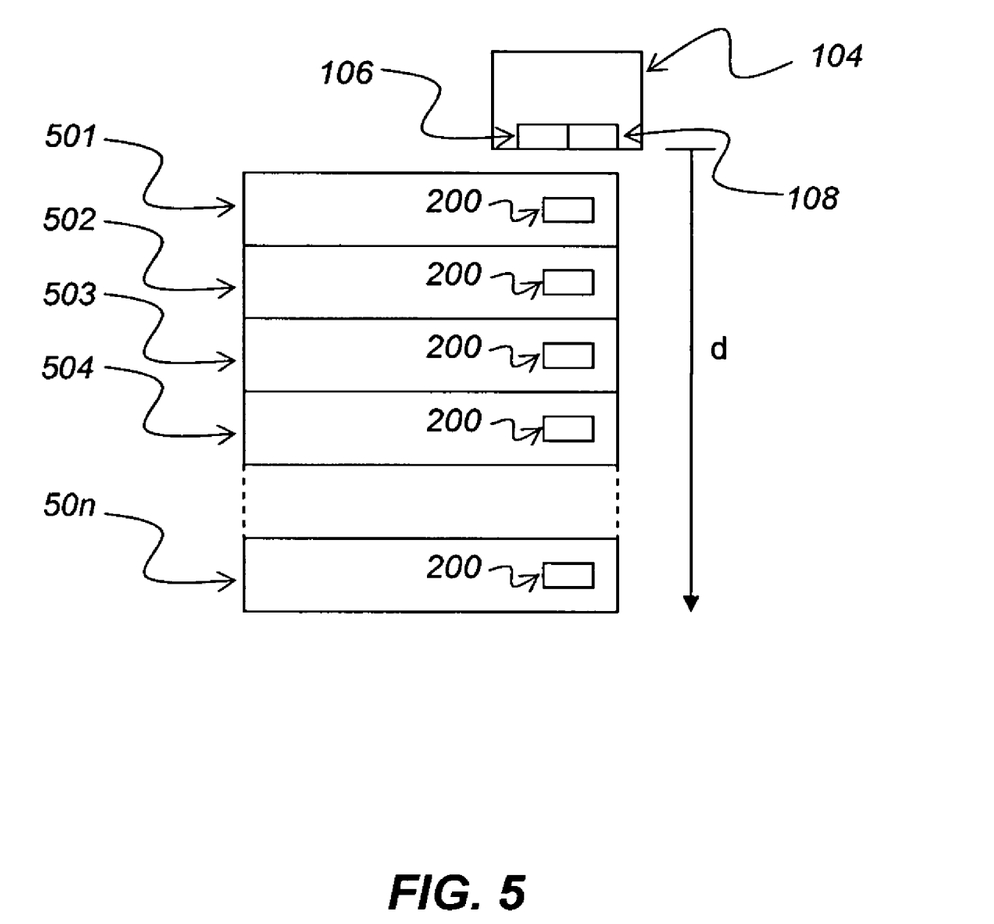
FIG. 5 is a representation of an implementation in which the data storage device of FIG. 4 may be put to use.

In the specific embodiment of the invention shown in FIG. 5, a data storage device 102 is shown in the form of a memory tag 200 embedded in individual sheets 501-50$n$ of paper ("memory-tag paper") arranged in a stack 500 of paper.

The interrogator 102 can be installed, for example, in a paper scanning device (not shown) (e.g. a document copier) and is arranged so that it can communicate with individual memory tags 200 in the stack 500 of paper stored in the scanning device.

The heat source 106 generates heat at the uppermost sheet of the stack 500. The order number of each sheet 501-50$n$ in the stack is directly proportional to its distance D from the heat source 106—i.e. the further away from the uppermost sheet a given sheet of memory-tag paper 501-50$n$ is positioned, the lower its temperature (measurable by its heat sensor 114) will be.

Figure 6:
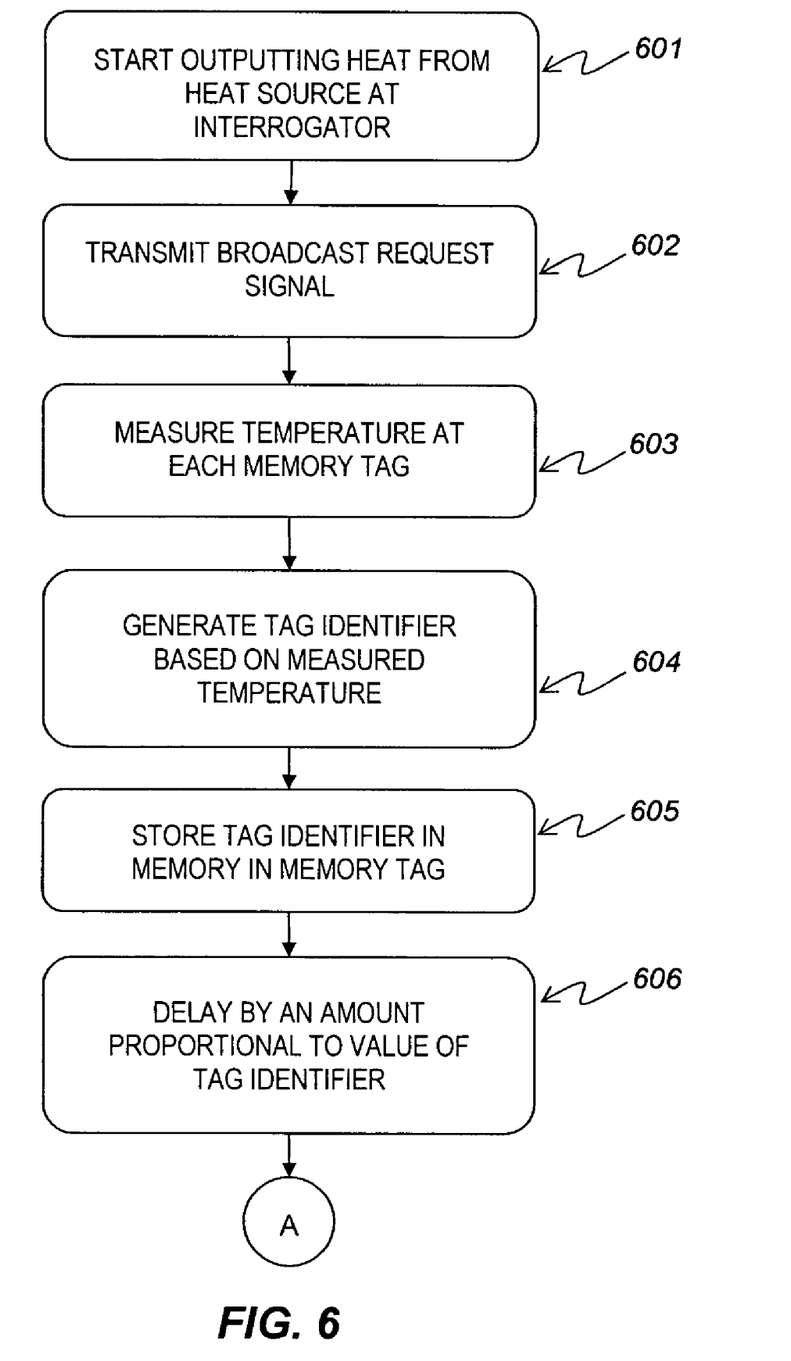
FIG. 6 is a flow diagram depicting a method of identifying a data storage device according to the invention.

Hence, when the paper scanning device intends to communicate with a given sheet 501-50$n$ in the stack 500, the following sequence of steps occurs:

1. The interrogator 104 generates heat at heat source 106 which is directed towards the uppermost sheet of the stack 500 above the position in which the memory tags 200 in the sheets 501-50$n$ are located (step 601).
2. The interrogator 102 transmits a broadcast request signal to the stack 500 (step 602).
3. Each memory tag 200 responds to the broadcast request signal by measuring the temperature at its heat sensor 114 (step 603).
4. The measured temperature is converted to an identification value (a tag identifier) by the processor 120 in each memory tag 200 (step 604).
5. Each identification value is stored in memory 122 in its memory tag 200 (step 605).
6. Each determined identification value is output from each memory tag by device transceiver 124 after a delay calculated by the processor 120 which corresponds to the determined identification value (steps 606 and 607).
7. The identification values are received sequentially by the interrogator transceiver 108 (step 608).
8. The interrogator 104 transmits an open-channel command message from interrogator transceiver 108 including the identification value of the memory tag 200 to which it is intended to communicate (step 609).
9. Each memory tag 200 receives the open-channel message (step 610).
10. A memory tag 200 acts on the received open-channel message only if the message contains the identification value which is stored in its memory 122 (step 611).

The aforementioned steps are summarised in the flowchart shown in FIG. 6.

It will of course be understood that the present invention has been described above by way of example only and that modifications of detail can be made within the scope of the invention.

The invention claimed is:

1. A method of identifying one or more of a plurality of data storage devices, comprising:
    heating the plurality of data storage devices with a heat source;
    measuring temperatures generated by the heat source at each of the plurality of data storage devices;
    generating identifiers that correspond to the temperatures measured at the plurality of data storage devices;
    transmitting the identifiers to an interrogator; and
    determining, based on the identifiers corresponding to the temperatures, a relative location of each of the plurality of data storage devices to the interrogator.

2. The method of claim 1 further comprising, storing, in a table, temperature ranges that correspond to the identifiers.

3. The method of claim 1 further comprising:
    transmitting an identifier in an packet that includes a cyclic-redundancy check (CRC) field;
    checking the identifier against the CRC field to determine and resolve errors generated during transmission of the packet.

4. The method of claim 1, wherein the temperatures measured at the plurality of data storage devices are inversely proportional to a square of a distance from the heat source.

5. The method of claim 1 further comprising, delaying transmission of an identifier by a time period that corresponds to a temperature sensed at a data storage device that generated the identifier.

6. The method of claim 1 further comprising, assigning the identifiers to ranges of temperatures so that a data storage device closest to the interrogator has a lowest identifier.

7. The method of claim 1 further comprising, preventing overlapping transmissions from the plurality of data storage devices occurring at a same time at the interrogator by delaying transmission of the identifiers.

8. The method of claim 1 further comprising, determining, by the interrogator, a relative distance from the interrogator to each of the plurality of data storage devices.

9. The method of claim 1 further comprising:
    receiving an identifier from a data storage device;
    transmitting, from the interrogator to the plurality of data storage devices, an open-channel message that includes the identifier of the data storage device to which communication is desired.

10. An identification system, comprising:
    a plurality of data storage devices, each comprising:
        a temperature sensor configured to detect temperature and output a temperature signal corresponding to the detected temperature, and
        an identification unit connected to the temperature sensor and configured to generate and output, on receipt of an interrogation signal, an identification signal based on the temperature signal; and
    an interrogator having a heat source for heating the plurality of data storage devices, wherein the interrogator uses the identification signal based on the temperature to determine a location of a data storage device with respect to the interrogator.

11. The identification system of claim 10, wherein the interrogator determines a relative distance from the interrogator to each of the plurality of data storage devices.

12. The identification system of claim 11, wherein the identification signal is processed to generate a numerical value proportional to a temperature detected at one of the plurality of data storage devices.

13. The identification system of claim 10, further comprising a wireless transceiver connected to the identification unit and configured to transmit the identification signal as a radio frequency signal.

14. The identification system of claim 13,
wherein the wireless transceiver is configured to receive the interrogation signal from the interrogator and transmit the identification signal to the interrogator.

15. The data storage device of claim 10, wherein the identification unit delays transmission of the identification signal by an amount corresponding to a value of the identification signal.

16. The identification system of claim 10, wherein the identification unit comprises:
a memory storing a plurality of identifiers, each identifier corresponding to a subset of temperature values in a range of temperature values; and
a processor connected to the memory and configured to receive the temperature signal and obtain and output the identifier from the memory which corresponds to the subset of temperature values containing the temperature represented by the temperature signal.

17. The identification system of claim 16, wherein the processor is further configured to store the outputted identifier in the memory and wherein the wireless transceiver is further configured to receive a command message including an identifier from an interrogator and the identification unit is further configured to determine whether the identifier in the command message corresponds to the identifier previously output from the identification unit.

18. The identification system of claim 17, wherein each subset of temperature values has a range of 5 degrees Celsius.

19. The identification system of claim 17, wherein each subset of temperature values has a range of 1 degree Celsius.

20. The identification system of claim 10, wherein the data storage device is a radio frequency identification tag.

\* \* \* \* \*